United States Patent [19]
Mehta

[11] Patent Number: 5,277,244
[45] Date of Patent: Jan. 11, 1994

[54] RELAY CONTACT MONITORING SYSTEM

[75] Inventor: Vinay Mehta, Germantown, Tenn.

[73] Assignee: Hunter Fan Company, Memphis, Tenn.

[21] Appl. No.: 963,691

[22] Filed: Oct. 20, 1992

[51] Int. Cl.$^5$ .............................................. F23N 5/20
[52] U.S. Cl. .......................................... 165/2; 165/27
[58] Field of Search ................... 165/2, 12, 24, 25, 27

[56] References Cited

U.S. PATENT DOCUMENTS

| | | | |
|---|---|---|---|
| 1,979,114 | 10/1934 | Meiners | 340/686 |
| 2,786,989 | 3/1957 | Smith, Jr. | 340/679 |
| 2,825,050 | 2/1958 | Hausten | 307/134 |
| 3,872,473 | 3/1975 | Melgaard et al. | 340/520 |
| 3,967,180 | 6/1976 | Weber et al. | 320/13 |
| 4,236,149 | 11/1980 | Soyck | 340/644 |
| 4,456,943 | 6/1984 | Judy | 361/160 |
| 4,468,768 | 8/1984 | Sunkle et al. | 371/16.1 |
| 4,531,198 | 7/1985 | Matsuda | 395/575 |
| 4,534,406 | 8/1985 | Newell, III et al. | 165/12 |
| 4,558,227 | 12/1985 | Yanada et al. | 290/40 R |
| 4,661,766 | 4/1987 | Hoffman et al. | 323/287 |
| 4,681,190 | 7/1987 | Toshiaki | 187/101 |
| 4,682,279 | 7/1987 | Watabe | 165/12 X |
| 4,864,285 | 9/1989 | Rodden | 340/644 |
| 4,898,229 | 2/1990 | Brown et al. | 165/27 X |
| 4,899,130 | 2/1990 | Rossberg | 340/438 |
| 4,985,638 | 1/1991 | Brock | 307/38 |
| 5,008,516 | 4/1991 | Holling | 219/519 |
| 5,107,918 | 4/1992 | McFarlane et al. | 165/12 |
| 5,127,464 | 7/1992 | Butler et al. | 165/27 X |

Primary Examiner—John Rivell
Attorney, Agent, or Firm—Baker & Botts

[57] ABSTRACT

A switching system for switching on and off heating and air conditioning units in an environmental control system. The switching system includes a thermostat and a relay conductively coupled to the thermostat. The relay has a contact, which is responsive to a change signal for changing its position. The system further includes a programmable monitor having predetermined positions stored in a memory. The monitor is conductively coupled to the contact and to the thermostat for continually determining the position of the contact, and for sending a change signal to the relay for switching the position of the contact, as needed, to be in conformance with a predetermined position stored in the memory.

15 Claims, 3 Drawing Sheets

RELAY CONTACT MONITORING SYSTEM

BACKGROUND AND SUMMARY OF THE INVENTION

A microprocessor-controlled programmable thermostat has become a popular "after-market" device to control a residential heating and air conditioning system. However, such a thermostat is often incompatible with the electronic module in the heating and air conditioning system. The compatibility problem is usually caused by the solid state switch, called a "triac", used by the programmable thermostat. The triac usually does not break sufficiently "clean".

One way to solve the compatibility problem is to use a pulse snap action relay instead of a triac. A pulse from a microprocessor switches the relay from an "on" position to an "off" position, or from "off" to "on". This relay makes contact and breaks contact cleaner than a triac. However, a pulse snap action relay has the problem that sometimes spurious signals in the power lines or even radio signals can cause the relay to change its on-off position.

The system of the present invention solves the above-noted and other problems of the prior art by providing a method and apparatus for monitoring and correcting the position of the contacts of a relay. The invention features the capability of continually monitoring the position of the thermostat's relay.

The invention provides an air temperature control system which includes a thermostat and a relay conductively coupled to the thermostat. The relay has a contact or contacts. The system further includes a programmable monitor conductively coupled to the contact and to the thermostat for continually determining the position of the contact, and adjusting the position, as needed, to be in conformance with a predetermined position stored in the monitor. In another feature of the invention, the thermostat is a microprocessor-controlled programmable thermostat. In another feature of the invention, the monitor has a memory containing predetermined positions for the contact. In still another feature of the invention, the relay is a snap action pulse relay.

BRIEF DESCRIPTION OF THE DRAWINGS

The above-noted and other aspects of the present invention will become more apparent from a description of the preferred embodiment when read in conjunction with the accompanying drawings. The drawings illustrate the preferred embodiment of the invention. In the drawings the same members have the same reference numerals.

DESCRIPTION OF THE PREFERRED EMBODIMENT

Figure 1:
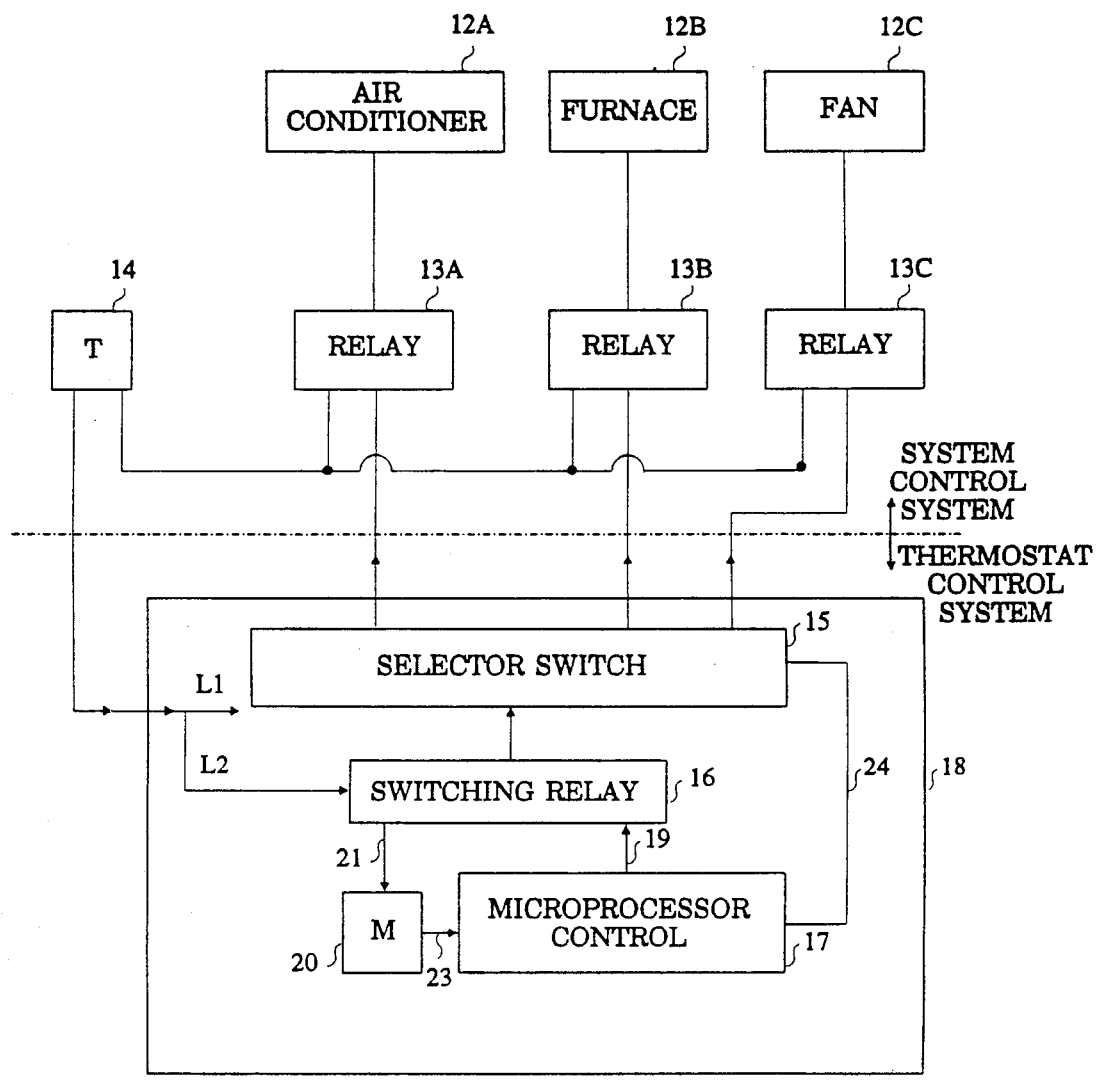
FIG. 1 depicts an air temperature control system having heating and air conditioning units, built according to the present invention.

Referring now to FIG. 1, the preferred embodiment of an air temperature control system 10 includes an air conditioning unit 12A, a furnace 12B, a fan 12C, power relays 13A, 13B, and 13C, a control transformer 14, and a programmable thermostat 18.

The control transformer 14 in the preferred embodiment supplies 24 volts of power. It is normally part of the control system for the furnace 12. The control transformer 14 provides power to the thermostat 18.

The programmable thermostat 18 is conductively coupled to each of the three relays 13, and to the control transformer 14. The three relays are also each conductively coupled to the transformer 14. Relay 13A is conductively coupled to the air conditioning unit 12A and operates to turn it on. Relay 13B is conductively coupled to the furnace 12B and operates to turn it on. Relay 13C is conductively coupled to the furnace 12C and operates to turn it on. The thermostat 18 includes a selector switch 15, a switching relay 16, a microprocessor controller 17, and a monitor 20. In an alternate embodiment, the monitor can be separate from, but conductively coupled to, the thermostat 18. In still another embodiment, the monitor 20 can be part of the controller 17, integrated into the controller 17 by suitable software. The switching relay 16 is conductively coupled to the control transformer 14, the selector switch 15, the controller 17, and the monitor 20. The monitor 20 is also conductively coupled to the controller 17. The monitor is programmed with desired positions of the relay. Those positions, programmed by the user, may depend on the time of year or the time of day, or both, and indicate whether the relay should connect the thermostat to the air conditioning unit or to the heating unit. The monitor determines the position of the relay and compares the position with the programmed positions. If the position is incorrect, the monitor resets the position of the relay to the correct position.

Figure 2:
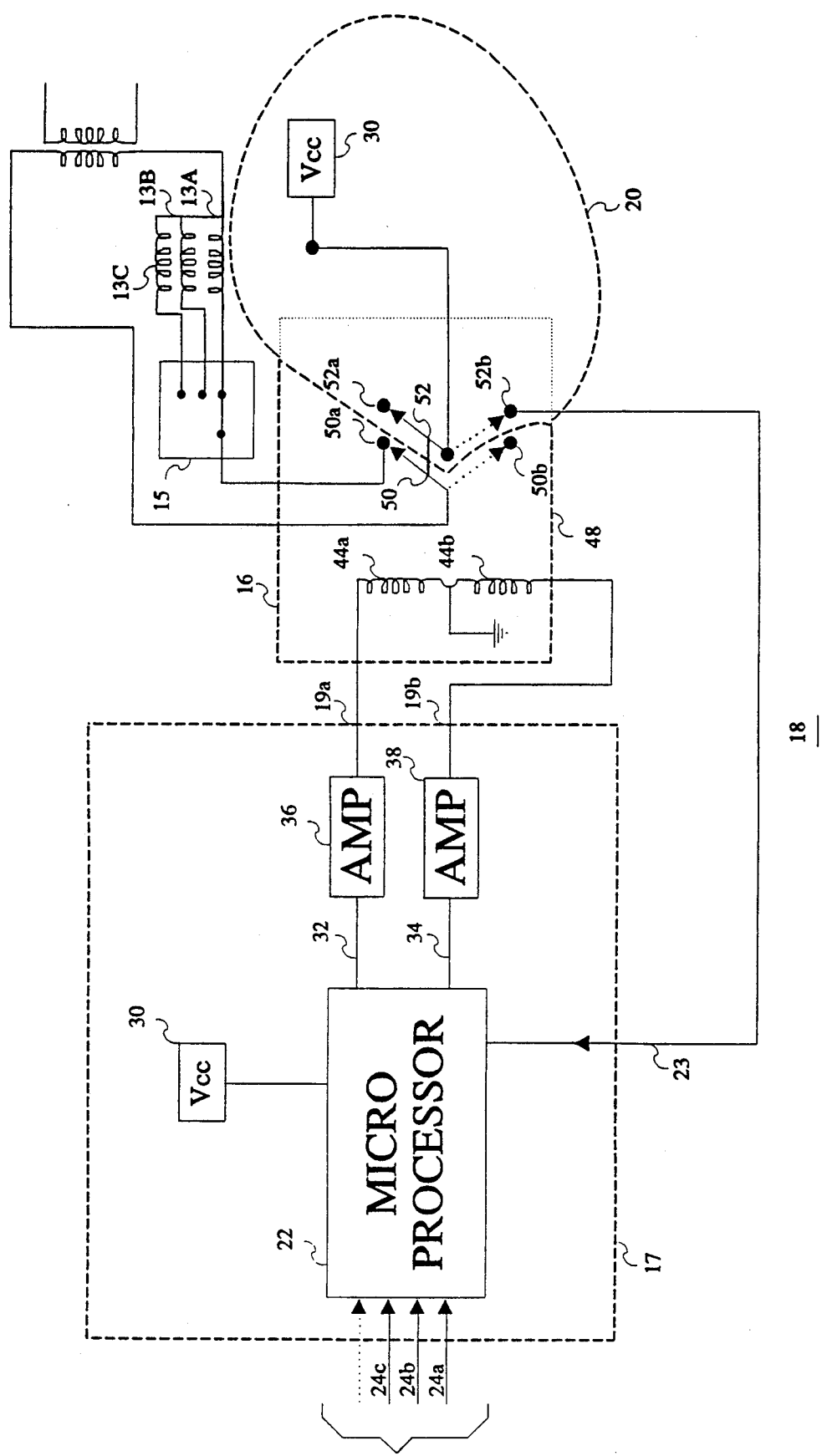
FIG. 2 is a block diagram depicting the programmable thermostat of the present invention.

The selector switch 15 has the following four positions: heat, cool, auto, and off, which are manually selected by the user. In the auto position the heating and cooling system changes automatically depending on the heating and cooling program of the thermostat 18. The controller 17 senses the temperature which is to be controlled, and sends a switching signal S1 on a control line 19 to the switching relay 16, based on the control program set by the user of the thermostat 18. The switching relay 16 is a typical pulse-type snap-action relay. It turns the system, whether heating or cooling, on or off, depending on the position of the selector switch 15. An on/off signal S1 from the controller 17 on the control line 19 to the switching relay 16 determines the on/off position. The position of the selector switch 15 is monitored by multiple monitoring lines, three of which, lines 24a, 24b, and 24c, are shown in FIG. 2, and are depicted as a single line 24 in FIG. 1. A signal S2 on monitoring lines 24 gives the controller 17 the position of the selector switch 15. In response to the signal S2, the controller 17 sends the appropriate on or off signal S1 to the switching relay 16.

The monitor 20 is actually a monitoring control system. The monitor 20 monitors the position of the switching relay 16 via a signal S3 on a monitoring line 21. The monitor 20 sends an alert signal S4 on a monitor line 23 to the controller 17 whenever the position of a relay contact of the switching relay 16 is detected, via signal S3, as being incorrect. The controller 17 immediately responds and sends the signal S1 to the switching relay 16 to correct the position of the switching relay. The monitoring and correcting process is a continual process.

Referring now to FIG. 2, a block diagram depicts the programmable thermostat 18 of the present invention. The thermostat includes a microprocessor 22 which has several input lines, of which three are shown: 24a, 24b, and 24c, on which it receives the signal S2. The microprocessor 22 is connected to a DC voltage supply 30. The microprocessor 22 has two output lines 32 and 34, which are each connected to its own amplifier 36 and 38. The output lines 19a, 19b, containing the output signal S1, of the amplifiers are connected to coils 44a and 44b respectively, of a relay 48. The relay 48 is a double pole, double throw. Contacts 50 and 52 of the relay are the double throw contacts. When the coil 44a is energized, the contacts 50 and 52 make connection with contacts 50a and 52a. When the coil 44b is energized, the contacts 50 and 52 make connection with contacts 50b and 52b. The power relays 13A, 13B, and 13C are conductively coupled, via the selector switch 15, to the contact 50a. The contact 52 is connected to the supply voltage 30.

In operation, assuming that the user has selected the "heat" position of the selector switch 15, when the thermostat calls for heat to be "on", the microprocessor 22 sends a voltage pulse on the line 32, 40, thus energizing the coil 44a. In response, the contact 50 connects to the contact 50a, energizing the power relay 13B, thus turning on the furnace. At the same time, the contact 52 connects to the contact 52a. Thus, there is no voltage on the monitor line 23 to the microprocessor. The lack of voltage on the monitor line 23 indicates to the microprocessor that the relay 48 operated correctly. If voltage did appear on the monitor line 23 when the thermostat had called for to be "on", the microprocessor 22 would continue to send voltage pulses on the line 32, 40 until there was no voltage on the monitor line 56.

In operation, when the thermostat calls for heat to be "off", the microprocessor 22 sends a voltage pulse on the line 34, 42, thus energizing the coil 44b. In response, the contact 50 connects to the contact 50b, de-energizing the coil 13B, thus turning off the furnace. At the same time, the contact 52 connects to the contact 52b. Thus, the supply voltage 30 is connected to the monitor line 23 to the microprocessor. The voltage on the monitor line 23 indicates to the microprocessor that the relay 48 operated correctly. If voltage did not appear on the monitor line 23 when the thermostat had called for the heat to be "off", the microprocessor 22 would continue to send voltage pulses on the line 34, 42 until the supply voltage 30 appeared on the monitor line 23. In either situation, whether the thermostat wants the heat "on" or "off", the microprocessor is continually monitoring the monitor line 23. Also, the thermostat is not limited to just calling for one condition, "on" or "off". That is, the thermostat is programmable, and the user can program into the memory of the microprocessor a number of switches between "on" and "off" during a twenty-four hour period.

Figure 3:
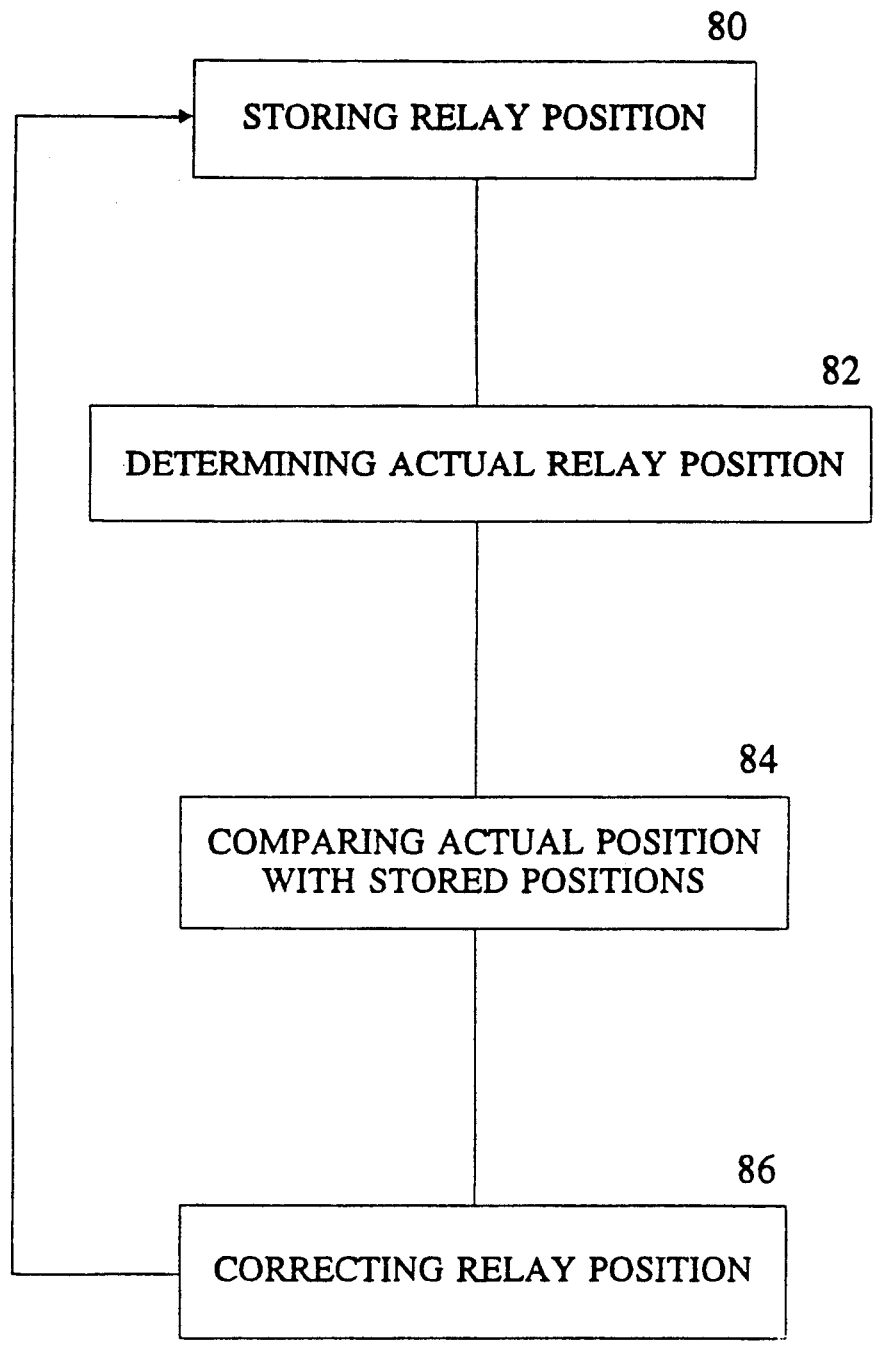
FIG. 3 is a flow chart depicting the method of the present invention for switching between the heating and air conditioning units of an environmental control system.

Referring now to FIG. 3, a flow chart depicts the switching method of the present invention. The method begins with the thermostat calling for heat to be "on" or "off", thereby storing 80 the correct relay position. The microprocessor then monitors the line 56, thus determining 82 the actual relay position. The method continues with the microprocessor comparing 84 the actual position with the correct, or stored position. Finally, the method concludes with the thermostat correcting 86 the relay position, as needed, to conform the actual position with the stored position. As stated previously, steps 82, 84, and 86 are continually performed by the thermostat.

The principles, preferred embodiments, and modes of operation of the present invention have been described in the foregoing specification. The invention is not to be construed as limited to the particular forms disclosed, because these are regarded as illustrative rather than restrictive. Moreover, variations and changes may be made by those skilled in the art without departing from the spirit of the invention.

I claim:

1. An air temperature control system comprising:
   a. a thermostat;
   b. a relay conductively coupled to the thermostat, the relay having a contact;
   c. a programmable monitor conductively coupled to the contact and to the thermostat for continually determining the position of the contact, and adjusting the position to be in conformance with a predetermined position stored in the monitor.

2. The air temperature control system of claim 1 wherein the thermostat is a microprocessor-controlled programmable thermostat.

3. The air temperature control system of claim 2 wherein the monitor has a memory containing predetermined positions for the contact.

4. The air temperature control system of claim 3 wherein the relay is a snap action pulse relay.

5. The air temperature control system of claim 4, further including an air conditioning unit and a heating unit, and wherein the contact makes a connection between the thermostat and one of the units.

6. A programmable thermostat for use in an environmental control system, the thermostat comprising:
   a. a relay having a contact;
   b. a microprocessor conductively coupled to the contact for continually determining the position of the contact, and adjusting the position to be in conformance with a predetermined position.

7. The thermostat of claim 6 wherein the thermostat is a microprocessor-controlled programmable thermostat.

8. The thermostat of claim 7 wherein the microprocessor has a memory containing predetermined positions for the contact.

9. The thermostat of claim 8 wherein the relay is a snap action pulse relay.

10. The thermostat of claim 9, wherein the environmental control system includes an air conditioning unit and a heating unit, and wherein the contact makes a connection between the thermostat and one of the units.

11. A switching system for switching on and off a heating unit and an air conditioning unit in an environmental control system, the switching system comprising:
   a. a thermostat;
   b. a relay conductively coupled to the thermostat, the relay having a contact, the relay responsive to a change signal for changing its position;
   c. a programmable monitor having predetermined positions stored in a memory, the monitor conductively coupled to the contact and to the thermostat for continually determining the position of the contact, and for sending a change signal to the relay for switching the position of the contact to be in conformance with a predetermined position stored in the memory.

12. The switching system of claim 11 wherein the change signal is a voltage pulse.

13. The switching system of claim 12 wherein the relay is a snap action relay.

14. The switching system of claim 13 wherein the thermostat is a microprocessor-controlled programmable thermostat.

15. A method for switching on and off heating and air conditioning units in an environmental control system, the system having a microprocessor-controlled programmable thermostat, a snap action relay conductively coupled to the thermostat, the relay having a contact, the relay responsive to a voltage pulse for changing the contact's position, and a programmable monitor conductively coupled to the contact and to the thermostat, the monitor having a memory, the method comprising the steps of:

a. storing predetermined contact positions in the memory;

b. continually determining the position of the contact;

c. comparing the position of the contact with the predetermined contact positions; and d. correcting the position by sending a voltage pulse to the relay for switching the position of the contact to be in conformance with a predetermined position stored in the memory.

\* \* \* \* \*